US012508616B1

(12) United States Patent
Qiao

(10) Patent No.: US 12,508,616 B1
(45) Date of Patent: Dec. 30, 2025

(54) MOBILE PHONE CASE WITH WHITE PRINTING AREA AND PRINTING DEVICE FOR SAME

(71) Applicant: Xiaofan Qiao, Suining County (CN)

(72) Inventor: Xiaofan Qiao, Suining County (CN)

( * ) Notice: Subject to any disclaimer, the term of this patent is extended or adjusted under 35 U.S.C. 154(b) by 0 days.

(21) Appl. No.: 19/190,721

(22) Filed: Apr. 27, 2025

(30) Foreign Application Priority Data

Oct. 18, 2024 (CN) ......................... 202422527082.7

(51) Int. Cl.
*B05B 12/32* (2018.01)
*B05B 13/02* (2006.01)

(52) U.S. Cl.
CPC .......... *B05B 12/32* (2018.02); *B05B 13/0278* (2013.01); *B05B 13/0285* (2013.01)

(58) Field of Classification Search
None
See application file for complete search history.

(56) References Cited

U.S. PATENT DOCUMENTS 3,380,434 A * 4/1968 Faber ...................... B05B 12/20 118/500
7,029,533 B1 * 4/2006 Hedding ................. B05B 16/40 118/305
7,077,909 B1 * 7/2006 Crane ...................... B05B 12/24 118/503
2011/0091655 A1 * 4/2011 Parling ................... B05B 14/44 118/50
2016/0037865 A1 * 2/2016 Marker ................... B05B 16/00 118/313
2017/0274403 A1 * 9/2017 Miki ....................... B05B 12/20
2020/0023401 A1 * 1/2020 Pickworth ............... B05B 16/80

FOREIGN PATENT DOCUMENTS

CN 212820629 U * 3/2021
CN 221290081 U * 7/2024
CN 221387220 U * 7/2024

* cited by examiner

*Primary Examiner* — Binu Thomas
(74) *Attorney, Agent, or Firm* — Nitin Kaushik

(57) ABSTRACT

Disclosed is a mobile phone case with a white printing area and a printing device for same, including a mobile phone case and a workbench. A top of the mobile phone case is fixedly connected to a spraying panel. An inner wall of the workbench is fixedly connected to a placement table, the placement table provides a placement area for the mobile phone case, a shielding assembly is arranged inside the workbench, a top of the workbench is fixedly connected to a raw material box, the raw material box is internally fixedly connected to a conveying tube, a triple-nozzle tube is arranged at a bottom of the conveying tube, and an outer wall of the triple-nozzle tube is provided with a replacement assembly. Protective covers on both sides limit and isolate a spraying range of an outer wall of the mobile phone case.

9 Claims, 5 Drawing Sheets

MOBILE PHONE CASE WITH WHITE PRINTING AREA AND PRINTING DEVICE FOR SAME

CROSS REFERENCE TO RELATED APPLICATIONS

The present disclosure claims the priority of Chinese Patent Application No. 2024225270827 filed on Oct. 18, 2024. All the above are hereby incorporated by reference in their entirety.

TECHNICAL FIELD

The present disclosure relates to the technical field of mobile phone case printing, and specifically relates to a mobile phone case with a white printing area and a printing device for same.

BACKGROUND

Personalized demand for various appearances of mobile phone cases as important accessories for protecting mobile phones is increasingly growing. In a process of printing mobile phone case patterns, it is required to apply a background color to an outer surface of a mobile phone case through a spraying device, and the device has the following advantages and benefits: First, the device is capable of achieving high-precision spraying and making various colors and patterns available to the mobile phone case, so as to meet consumers' personalized aesthetic needs. Secondly, through use of advanced spraying technology, paint can be evenly attached to a surface of the mobile phone case, thereby enhancing durability and wear resistance of the mobile phone case. Moreover, an automated spraying device is capable of improving production efficiency, reducing production costs, and meeting large-scale production demands.

A mobile phone case spraying device of the prior art usually includes a spray gun, a paint supply system, a conveying device, a control system and the like. The spray gun is responsible for spraying paint onto the surface of the mobile phone case, and the paint supply system provides a stable flow of paint to the spray gun. The conveying device transports the mobile phone case to a spraying area and ensures accurate positioning of the mobile phone case in a spraying process. The control system precisely controls the entire spraying process, including spraying parameters of the spray gun and a speed of the conveying device. In terms of workflow, the mobile phone case is first placed on the conveying device, and the conveying device transports the mobile phone case to the spraying area. The spray gun, under control by the control system, sprays paint onto the surface of the mobile phone case. After the spraying is completed, the conveying device moves the mobile phone case out of the spraying area for subsequent processing and packaging.

However, there exist some problems in the spraying process of the mobile phone case. Due to relative color randomness of the surface of the mobile phone case, and easy similarity to subsequent printing colors, an effect of printing patterns of the mobile phone case might be reduced. Moreover, during spraying, paint is easily sprayed to a larger area of any other component surface. This is because the spraying device of the prior art usually lacks effective protective measures to limit and isolate a paint spraying range. When paint is sprayed onto a surface of any other component, it not only increases difficulty of subsequent cleaning, but also might damage the any other component, and affect normal operation of the device. Moreover, the cleaning process requires a lot of time and labor, and reduces production efficiency. Therefore, a mobile phone case with a white printing area and a printing device for same are provided to solve the above problems.

SUMMARY

In view of the defects in the prior art, the present disclosure provides a mobile phone case with a white printing area and a printing device for same, and overcomes the defects of traditional devices that paint is easily sprayed to a larger area of any other component surface during spraying, which increases difficulty of subsequent cleaning, and in a mobile phone case printing process, an effect of printing patterns is reduced due to easy similarity to a background color of the mobile phone case.

In order to achieve the above objective, the present disclosure is achieved by the following technical solution: a mobile phone case with a white printing area, including a mobile phone case, where a top of the mobile phone case is fixedly connected to a spraying panel, and the spraying panel is configured for providing a spraying space for pigments.

A printing device for a mobile phone case with a white printing area, includes a workbench, a bottom of an inner wall of the workbench is fixedly connected to a placement table, the placement table is configured for providing a placement area for the mobile phone case, a shielding assembly is arranged inside the workbench, the shielding assembly is configured for shielding sprayed paint, and a top of the workbench is fixedly connected to a raw material box, where the raw material box is internally fixedly connected to a conveying tube, a triple-nozzle tube is arranged at a bottom of the conveying tube, an outer wall of the triple-nozzle tube is provided with a replacement assembly, and the replacement assembly is configured for portable replacement of the triple-nozzle tube; and the shielding assembly includes protective covers, the protective covers are arranged on both sides of inside of the workbench, a bottom of the workbench is fixedly connected to a motor, an output end of the motor is fixedly connected to a gear, a bottom of either of the protective covers is fixedly connected to a sliding block, the sliding block is internally slidably connected to a limit plate, the limit plate is fixedly connected inside the workbench, one side of the sliding block is fixedly connected to a rack, and the rack is meshed with the gear.

Preferably, the replacement assembly includes arc-shaped clamping blocks, the arc-shaped clamping blocks are arranged on both sides of the triple-nozzle tube, and support plates are fixedly connected to the bottom of the workbench on both sides.

Preferably, a top of an inner wall of the workbench is fixedly connected to a fixed block, and the fixed block is internally fixedly connected to an electric telescopic rod.

Preferably, an output end of the electric telescopic rod is fixedly connected to a connecting block I, and the connecting block I is internally fixedly connected to a connecting pipe I.

Preferably, the connecting pipe I is fixedly connected to one end of the conveying tube, and connecting pipes II are fixedly connected to a bottom of the connecting block I on both sides.

Preferably, an outer wall of either of the connecting pipes II is slidably connected to a baffle, a bottom of either of the baffles is fixedly connected to a spring, and a bottom of the spring is fixedly connected to a fixing ring.

Preferably, the fixing rings are fixedly connected to outer walls of the connecting pipes II respectively, clamping columns are slidably connected to inside of either of the connecting pipes II on both sides, and each of the clamping columns is internally slidably connected to a sliding strip.

Preferably, an outer wall of the corresponding sliding strip is slidably connected to inside of the corresponding connecting pipe II, and the corresponding sliding strip is fixedly connected to an inner wall of the corresponding baffle.

Preferably, the arc-shaped clamping blocks are designed to closely fit the clamping columns in shape, a bottom of either of the arc-shaped clamping blocks is fixedly connected to a connecting column, a bottom of the connecting column is fixedly connected to a connecting block II, and the connecting block II is fixedly connected to a top of the triple-nozzle tube.

Working principle: During use of the device, the mobile phone case is placed on a top of the placement table, then the white paint in the raw material box is guided to the triple-nozzle tube by means of the conveying tube, and three nozzles of the triple-nozzle tube are used for spraying treatment of the top and two sides of the mobile phone case. Simultaneously, the electric telescopic rod is activated to drive the triple-nozzle tube 16 to move on the top of the mobile phone case, which ensures comprehensive spraying of the top of the mobile phone case without dead spots, and enhances a spraying effect of the device. Further, the white paint on the mobile phone case can create a contrasting color for subsequent pattern printing, which increases fidelity of pattern printing, and improves quality of the mobile phone case. Subsequently, the motor is turned on, and the output end of the motor drives the gear to rotate, which drives the racks on both sides to move towards each other. When moving, the racks drive the sliding blocks to slide on outer walls of the limit plates, and the limit plates limit movement of the sliding blocks to improve movement accuracy of the sliding blocks. When moving, the sliding blocks drive the protective covers on both sides to approach each other until they overlap, and the protective covers are capable of effectively reducing the paint spraying range and minimizing the contamination of a surrounding environment by the paint, such that difficulty of subsequent cleaning after using the device is reduced, and efficiency of cleaning the device is improved. When a spraying opening inside the triple-nozzle tube gets blocked and the triple-nozzle tube needs to be disassembled for cleaning, as the baffles on both sides are pulled, the springs are driven to compress, and when moving, the baffles move out of outer walls of the clamping columns, which provides space for the movement of the clamping columns. Moreover, the sliding strips are driven to slide at the inclined grooves inside the clamping columns, and the sliding of the sliding strips drives the clamping columns on both sides to move out of the outer walls of the arc-shaped clamping blocks. In this way, the original triple-nozzle tube at a bottom of the connecting block II can be quickly disassembled from a surface of the device. Then a new triple-nozzle tube is moved to the bottom of the connecting block I, and similarly, the clamping column can be re-clamped to an outer wall of the arc-shaped clamping block, so as to achieve portable installation of the triple-nozzle tube and improve the efficiency of replacing the triple-nozzle tube.

The present disclosure provides a mobile phone case with a white printing area and a printing device for same. The present disclosure has the following beneficial effects:

1. The present disclosure, by limiting and isolating a spraying range of an outer wall of the mobile phone case through the protective covers on both sides, overcomes the defects of traditional devices including that paint is easily sprayed to a larger area of any other component surface during spraying, which increases difficulty of subsequent cleaning, and improves efficiency of cleaning the device.

2. The present disclosure, by fixing the arc-shaped clamping blocks through the clamping columns, solves the problems that when the spray opening inside the triple-nozzle tube is blocked, the triple-nozzle tube needs to be disassembled for replacement, a special tool is usually used to remove screws at a top of the triple-nozzle tube, and it is easily obstructed by surrounding components during disassembly, which somewhat hinders the disassembly of the triple-nozzle tube, thereby enhancing the efficiency of replacing the triple-nozzle tube.

3. The present disclosure, by spraying the white paint in the raw material box onto a surface of the mobile phone case via the triple-nozzle tube, and creating the contrasting color for subsequent pattern printing, ensures fidelity of pattern printing, overcomes the defects of traditional devices that in a mobile phone case printing process, an effect of printing patterns is reduced due to easy similarity to a background color of the mobile phone case, increases the fidelity of pattern printing, and improves an effect of displaying patterns on the surface of the mobile phone case.

4. The present disclosure, by driving the triple-nozzle tube to move through the electric telescopic rod, and expanding the spraying range through the three nozzles of the triple-nozzle tube, ensures that paint is uniformly sprayed on the surface of the mobile phone case, and overcomes the defects of traditional devices that fixed spraying positions easily lead to dead spots of spraying, thereby enhancing the effect of spraying paint on the surface of the mobile phone case through the device.

In the figures: 1. workbench; 2. raw material box; 3. support plate; 4. conveying tube; 5. connecting block I; 6. fixed block; 7. electric telescopic rod; 8. motor; 9. gear; 10. rack; 11. sliding block; 12. limit plate; 13. protective cover; 14. placement table; 15. connecting pipe I; 16. triple-nozzle tube; 17. connecting block II; 18. fixing ring; 19. connecting pipe II; 20. arc-shaped clamping block; 21. connecting column; 22. clamping column; 23. sliding strip; 24. baffle; 25. spring; 26. mobile phone case; and 27. spraying panel.

DETAILED DESCRIPTIONS OF THE EMBODIMENTS

The technical solutions in the examples of the present disclosure will be clearly and completely described below with reference to the accompanying drawings in the examples of the present disclosure. Obviously, the described examples are merely some examples rather than all examples of the present disclosure. Based on the examples of the present disclosure, all other examples obtained by those of ordinary skill in the art without making creative efforts shall fall within the protection scope of the present disclosure.

EXAMPLE

Figure 1:
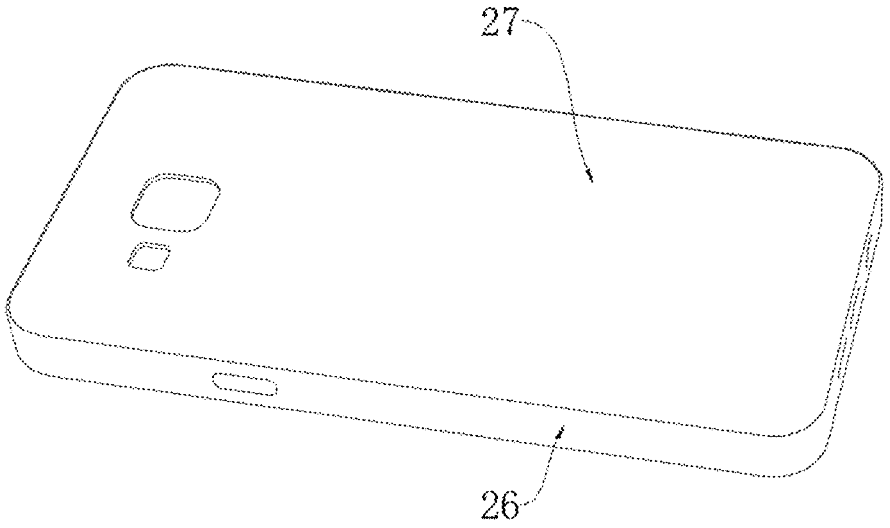
FIG. 1 is a three-dimensional schematic diagram of a mobile phone case in the present disclosure.

With reference to FIG. 1, in an example of the present disclosure, there is provided a mobile phone case with a white printing area: a mobile phone case 26 is included, a top of the mobile phone case 26 is fixedly connected to a spraying panel 27, and the spraying panel 27 is configured for providing a spraying space for pigments.

Specifically, a surface of the spraying panel 27 is sprayed with white paint, the white paint on the spraying panel 27 can create a contrasting color for subsequent pattern printing, and the white paint has relatively high brightness and purity, which can provide a good background color for the subsequent pattern printing. When the pattern printing is performed, colorful patterns will look more vivid and clearer against the white background, thereby increasing a fidelity of pattern printing, such that printed patterns look more beautiful and realistic.

Figure 2:
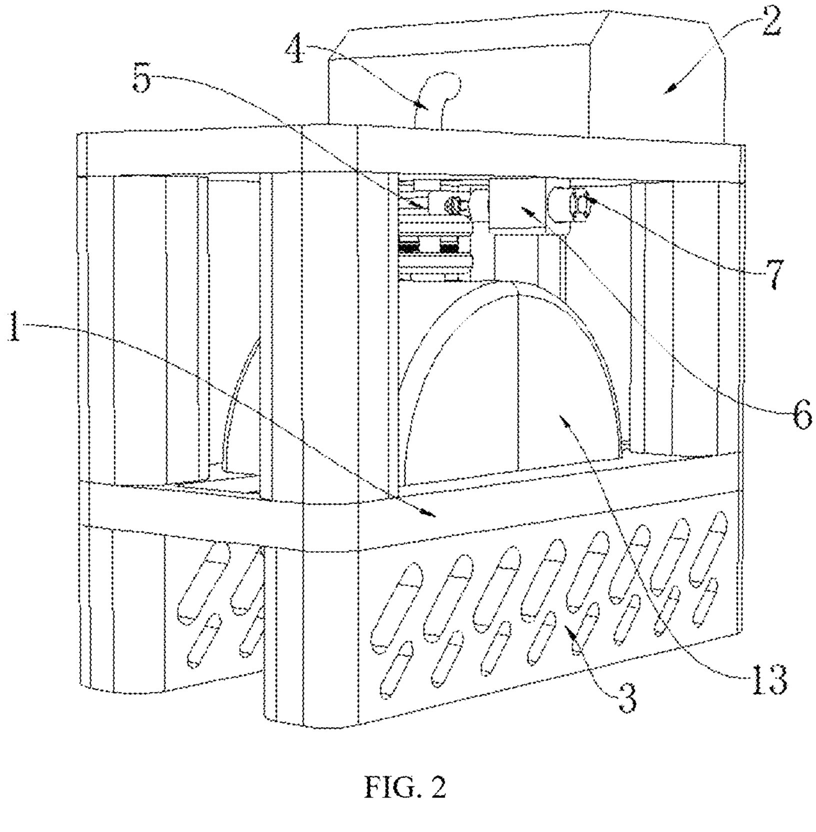
FIG. 2 is a three-dimensional schematic diagram of a printing device in the present disclosure.
Figure 7:
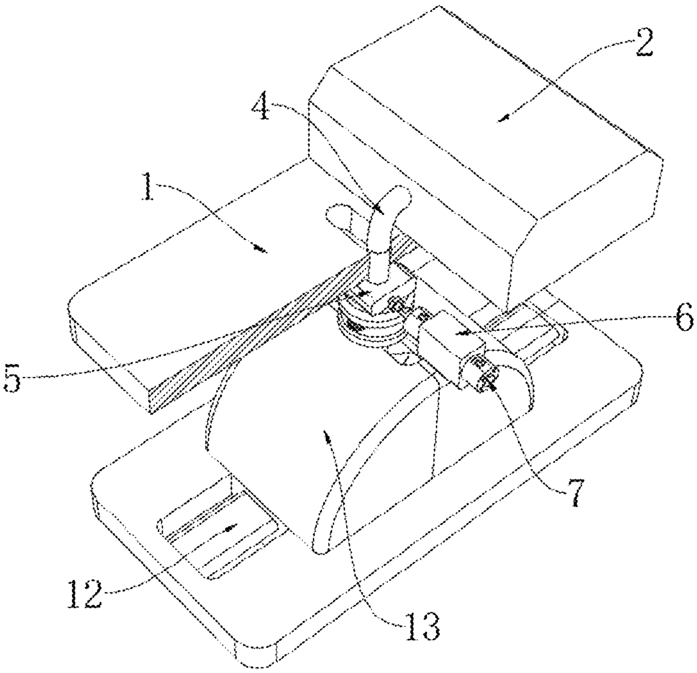
FIG. 7 is a structural schematic diagram of a conveying tube of a printing device in the present disclosure.
Figure 8:
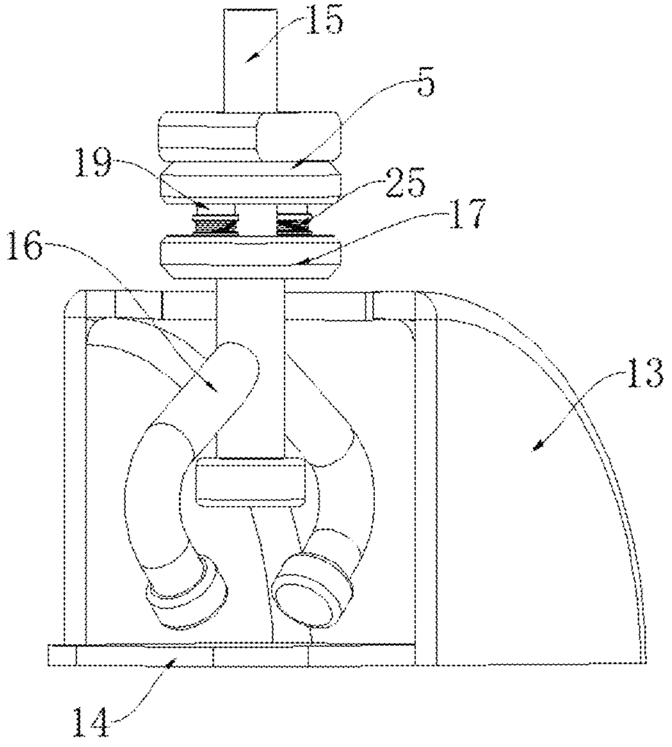
FIG. 8 is a structural schematic diagram of a triple-nozzle tube of a printing device in the present disclosure.

With reference to FIGS. 2, 7 and 8, in an example of the present disclosure, there is provided a printing device for a mobile phone case with a white printing area. According to the above mobile phone case with a white printing area, the device includes a workbench 1, and a bottom of an inner wall of the workbench 1 is fixedly connected to a placement table 14, where the placement table 14 can be made of a sturdy stainless steel material, and a surface thereof is very smooth due to fine polishing, thereby ensuring that the mobile phone case can be placed thereon smoothly without shaking or tilting. A shielding assembly is arranged inside the workbench 1, the shielding assembly is configured for shielding sprayed paint, and a top of the workbench 1 is fixedly connected to a raw material box 2, where the raw material box 2 is generally made of a high-strength plastic material, has good sealing property and corrosion resistance, and is capable of preventing paint leakage and deterioration. The raw material box 2 is internally fixedly connected to a conveying tube 4, a triple-nozzle tube 16 is arranged at a bottom of the conveying tube 4, and a head part of the triple-nozzle tube 16 is designed to have three nozzles that are capable of simultaneously spraying white paint evenly on a surface of the mobile phone case from different angles, thereby improving spraying efficiency and quality. An outer wall of the triple-nozzle tube 16 is provided with a replacement assembly, the replacement assembly is configured for portable replacement of the triple-nozzle tube 16, a top of the inner wall of the workbench 1 is fixedly connected to a fixed block 6, and the fixed block 6 is internally fixedly connected to an electric telescopic rod 7.

Specifically, the mobile phone case is placed on a top of the placement table 14, then the white paint in the raw material box 2 is sprayed onto the surface of the mobile phone case via the triple-nozzle tube 16 by means of the conveying tube 4, and then the electric telescopic rod 7 drives a connecting block I 5 to move, so as to drive the triple-nozzle tube 16 to move on the surface of the mobile phone case. During movement, the triple-nozzle tube 16 is capable of evenly spraying white paint on all parts of the mobile phone case, thereby ensuring comprehensive spraying of the mobile phone case.

Figure 3:
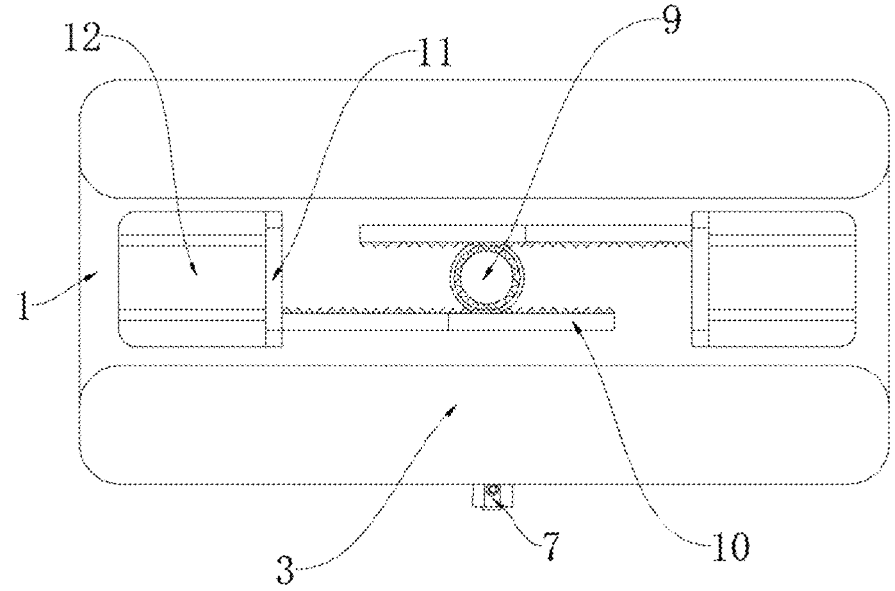
FIG. 3 is a schematic diagram of a planar structure of a bottom of a printing device in the present disclosure.
Figure 4:
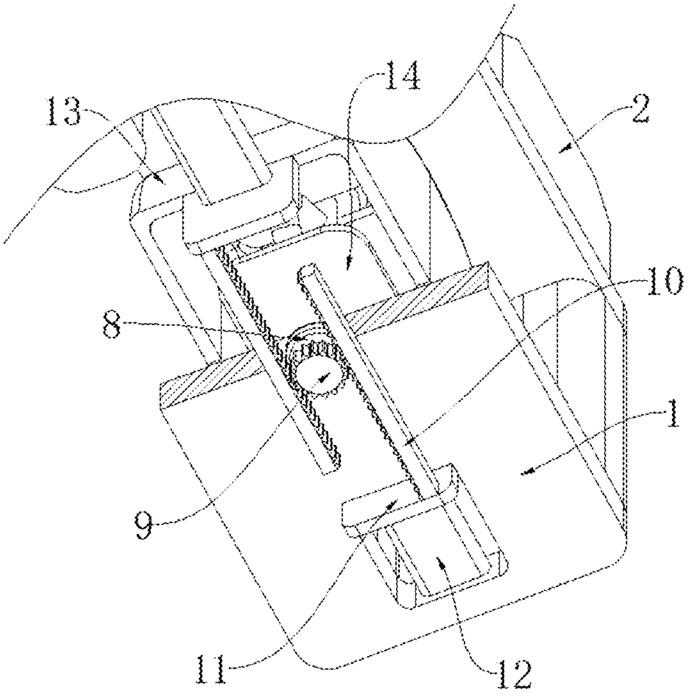
FIG. 4 is a structural schematic diagram of a limit plate of a printing device in the present disclosure.
Figure 5:
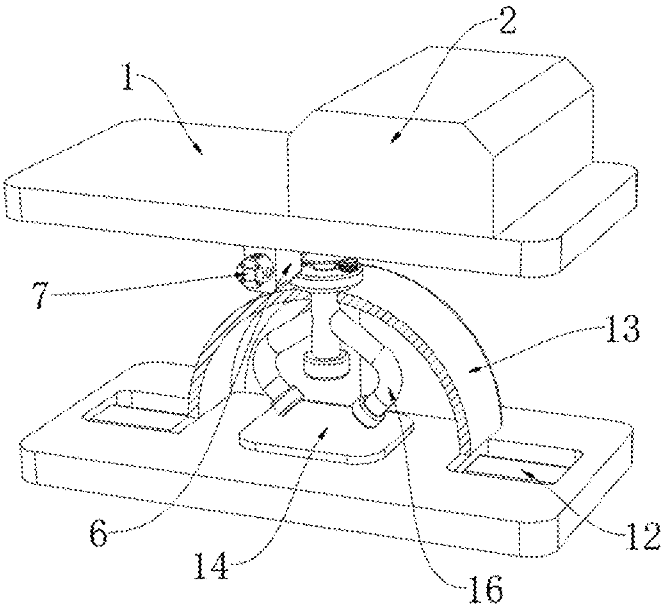
FIG. 5 is a structural schematic diagram of a protective cover of a printing device in the present disclosure.

With reference to FIGS. 3-5, the shielding assembly includes protective covers 13, the protective covers 13 are arranged on both sides of inside of the workbench 1, and the protective covers 13 can be made of a transparent acrylic material, which not only can provide a good protection effect, but also helps an operator to observe operating conditions of the device. Edges of the protective covers 13 can be sealed with rubber sealing strips to ensure effective reduction of a paint spraying range when the protective covers 13 are closed, and avoid excessive contamination of surrounding components. A bottom of the workbench 1 is fixedly connected to a motor 8, an output end of the motor 8 is fixedly connected to a gear 9, a bottom of either of the protective covers 13 is fixedly connected to a sliding block 11, the sliding block 11 is internally slidably connected to a limit plate 12, and the sliding block 11 can be made of a wear-resistant engineering plastic material, which has a low friction coefficient and good self-lubricating properties, and is capable of sliding smoothly on the limit plate 12. The limit plate 12 is fixedly connected inside the workbench 1, one side of the sliding block 11 is fixedly connected to a rack 10, and the rack 10 is meshed with the gear 9.

Specifically, during use of the device, the motor 8 is first turned on, the output end thereof drives the gear 9 to rotate, the rotation of the gear 9 drives the racks 10 on both sides to move towards each other, and when moving, the racks 10 drive the sliding blocks 11 to slide on outer walls of the limit plates 12. When moving, the sliding blocks 11 drive the protective covers 13 on both sides to approach each other until they overlap, and the protective covers 13 are capable of effectively reducing the paint spraying range and minimizing the contamination of a surrounding environment by the paint. In this way, difficulty of subsequent cleaning after using the device is reduced, and efficiency of cleaning the device is improved.

Figure 6:
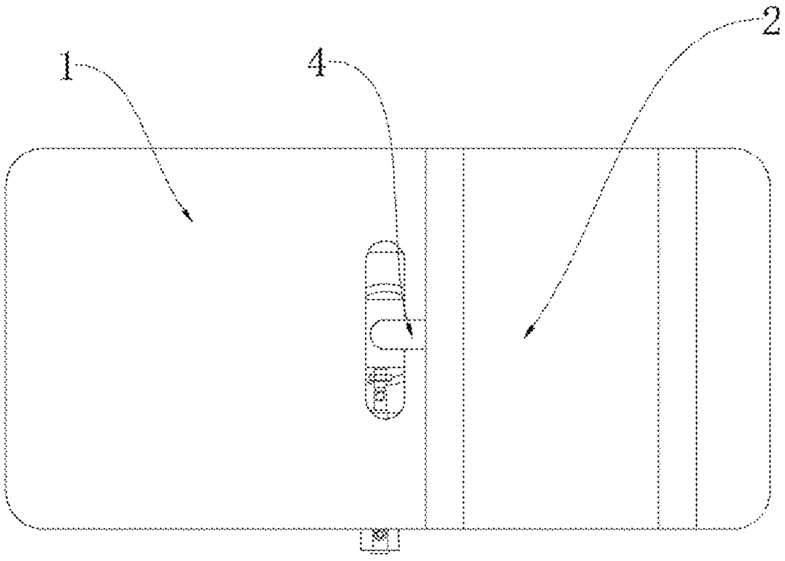
FIG. 6 is a schematic diagram of a planar structure of a top of a printing device in the present disclosure.
Figure 9:
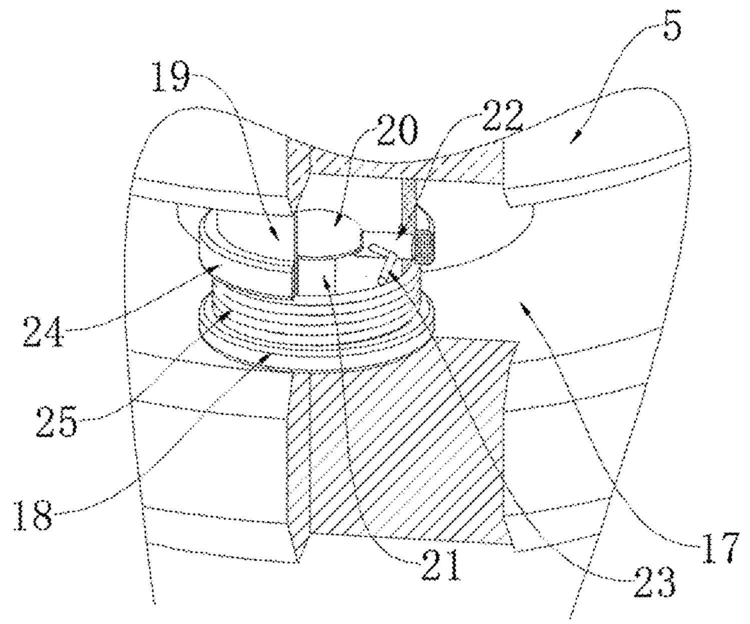
FIG. 9 is a structural schematic diagram of a clamping column of a printing device in the present disclosure.

With reference to FIGS. 6, 8, and 9, the replacement assembly includes arc-shaped clamping blocks 20, the arc-shaped clamping blocks 20 are arranged on both sides of the triple-nozzle tube 16, support plates 3 are fixedly connected to the bottom of the workbench 1 on both sides, an output end of the electric telescopic rod 7 is fixedly connected to the connecting block I 5, the connecting block I 5 is internally fixedly connected to a connecting pipe I 15, the connecting pipe I 15 is fixedly connected to one end of the conveying tube 4, connecting pipes II 19 are fixedly connected to a bottom of the connecting block I 5 on both sides, an outer wall of either of the connecting pipes II 19 is slidably connected to a baffle 24, and the baffle 24 can be made of the high-strength plastic material, and has certain toughness and wear resistance. Surfaces of the baffles 24 can be subjected to anti-skid treatment to better apply a force during pulling, a bottom of either of the baffles 24 is fixedly connected to a spring 25, a bottom of the spring 25 is fixedly connected to a fixing ring 18, and the fixing rings 18 are fixedly connected to outer walls of the connecting pipes II 19 respectively. Clamping columns 22 are slidably connected to inside of either of the connecting pipes II 19 on both sides, the clamping columns 22 are usually made of an alloy steel material and have relatively high strength and hardness, each of the clamping columns 22 is internally slidably connected to a sliding strip 23, and the sliding strip 23 can be made of a wear-resistant rubber material, has good elasticity and friction, and is capable of sliding stably at an inclined groove. An outer wall of the corresponding sliding strip 23 is slidably connected to inside of the corresponding connecting pipe II 19, and the corresponding sliding strip 23 is fixedly connected to an inner wall of the corresponding baffle 24. The arc-shaped clamping block 20 is arranged between the clamping columns 22 on both sides, and the arc-shaped clamping blocks 20 can be made of a high-strength engineering plastic material and have good toughness and impact resistance. The arc-shaped clamping blocks 20 are designed to closely fit the clamping columns 22 in shape, to ensure stability of connections, a bottom of either of the arc-shaped clamping blocks 20 is fixedly connected to a connecting column 21, a bottom of the connecting column 21 is fixedly connected to a connecting block II 17, and the connecting block II 17 is fixedly connected to a top of the triple-nozzle tube 16.

Specifically, when a spraying opening inside the triple-nozzle tube 16 gets blocked and the triple-nozzle tube 16 needs to be disassembled for cleaning, the operator first pulls the baffles 24 on both sides, when the baffles 24 are pulled, the springs 25 are driven to compress, and when moving, the baffles 24 move out of outer walls of the clamping columns 22, which provides space for the movement of the clamping columns 22. Moreover, as the baffles 24 move, the sliding strips 23 are driven to slide at the inclined grooves inside the clamping columns 22, and the sliding of the sliding strips 23 drives the clamping columns 22 on both sides to move out of the outer walls of the arc-shaped clamping blocks 20. In this way, the original triple-nozzle tube 16 at a bottom of the connecting block II 17 can be quickly disassembled from a surface of the device. Then a new triple-nozzle tube 16 is moved to the bottom of the connecting block I 5, and similarly, the clamping column 22 can be re-clamped to an outer wall of the arc-shaped clamping block 20, so as to achieve portable installation of the triple-nozzle tube 16. This method enables simple and quick installation, requires no complex tools and equipment, thus improving the efficiency of replacing the triple-nozzle tube 16.

Although the examples of the present disclosure have been illustrated and described, it should be understood that those of ordinary skill in the art may make various changes, modifications, replacements and variations to the above examples without departing from the principle and spirit of the present disclosure, and the scope of the present disclosure is limited by the appended claims and their legal equivalents.

What is claimed is:

1. A printing device for a mobile phone case with a white printing area, comprising a workbench, wherein a bottom of an inner wall of the workbench is fixedly connected to a placement table, the placement table is configured for providing a placement area for the mobile phone case, a shielding assembly is arranged inside the workbench, the shielding assembly is configured for shielding sprayed paint, and a top of the workbench is fixedly connected to a raw material box, wherein the raw material box is internally fixedly connected to a conveying tube, a triple-nozzle tube is arranged at a bottom of the conveying tube, an outer wall of the triple-nozzle tube is provided with a replacement assembly, and the replacement assembly is configured for portable replacement of the triple-nozzle tube; and the shielding assembly comprises protective covers, the protective covers are arranged on both sides of inside of the workbench, a bottom of the workbench is fixedly connected to a motor, an output end of the motor is fixedly connected to a gear, a bottom of either of the protective covers is fixedly connected to a sliding block, the sliding block is internally slidably connected to a limit plate, the limit plate is fixedly connected inside the workbench, one side of the sliding block is fixedly connected to a rack, and the rack is meshed with the gear.

2. The printing device for a mobile phone case with a white printing area according to claim 1, wherein the replacement assembly comprises arc-shaped clamping blocks, the arc-shaped clamping blocks are arranged on both sides of the triple-nozzle tube, and support plates are fixedly connected to the bottom of the workbench on both sides.

3. The printing device for a mobile phone case with a white printing area according to claim 2, wherein a top of the inner wall of the workbench is fixedly connected to a fixed block, and the fixed block is internally fixedly connected to an electric telescopic rod.

4. The printing device for a mobile phone case with a white printing area according to claim 3, wherein an output end of the electric telescopic rod is fixedly connected to a connecting block I, and the connecting block I is internally fixedly connected to a connecting pipe I.

5. The printing device for a mobile phone case with a white printing area according to claim 4, wherein the connecting pipe I is fixedly connected to one end of the conveying tube, and connecting pipes II are fixedly connected to a bottom of the connecting block I on both sides.

6. The printing device for a mobile phone case with a white printing area according to claim 5, wherein an outer wall of either of the connecting pipes II is slidably connected to a baffle, a bottom of either of the baffles is fixedly connected to a spring, and a bottom of the spring is fixedly connected to a fixing ring.

7. The printing device for a mobile phone case with a white printing area according to claim 6, wherein the fixing rings are fixedly connected to outer walls of the connecting pipes II respectively, clamping columns are slidably connected to inside of either of the connecting pipes II on both sides, and each of the clamping columns is internally slidably connected to a sliding strip.

8. The printing device for a mobile phone case with a white printing area according to claim 7, wherein an outer wall of the corresponding sliding strip is slidably connected to inside of the corresponding connecting pipe II, and the corresponding sliding strip is fixedly connected to an inner wall of the corresponding baffle.

9. The printing device for a mobile phone case with a white printing area according to claim 8, wherein the arc-shaped clamping block is arranged between the clamping columns on both sides, a bottom of either of the arc-shaped clamping blocks is fixedly connected to a connecting column, a bottom of the connecting column is fixedly connected to a connecting block II, and the connecting block II is fixedly connected to a top of the triple-nozzle tube.

* * * * *